(12) United States Patent
Sato et al.

(10) Patent No.: US 8,208,797 B2
(45) Date of Patent: Jun. 26, 2012

(54) TRANSPORT STREAM GENERATING APPARATUS, RECORDING APPARATUS HAVING THE SAME, AND TRANSPORT STREAM GENERATING METHOD

(75) Inventors: Masafumi Sato, Osaka (JP); Hiroaki Shimazaki, Osaka (JP); Masanori Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 1098 days.

(21) Appl. No.: 12/091,394

(22) PCT Filed: Oct. 24, 2006

(86) PCT No.: PCT/JP2006/321151
§ 371 (c)(1),
(2), (4) Date: Apr. 24, 2008

(87) PCT Pub. No.: WO2007/049609
PCT Pub. Date: May 3, 2007

(65) Prior Publication Data
US 2009/0263105 A1    Oct. 22, 2009

(30) Foreign Application Priority Data
Oct. 27, 2005   (JP) ................................. 2005-313465

(51) Int. Cl.
*H04N 5/91* (2006.01)
(52) U.S. Cl. ........................................ 386/314; 386/343
(58) Field of Classification Search .................. 386/314, 386/343
See application file for complete search history.

(56) References Cited

U.S. PATENT DOCUMENTS

| | | | |
|---|---|---|---|
| 6,542,518 B1 * | 4/2003 | Miyazawa | 370/468 |
| 7,106,946 B1 | 9/2006 | Kato | |
| 2004/0047616 A1 | 3/2004 | Uchiumi et al. | |
| 2004/0240863 A1 * | 12/2004 | Nishizawa | 386/125 |
| 2006/0159418 A1 | 7/2006 | Tada | |

FOREIGN PATENT DOCUMENTS

| | | |
|---|---|---|
| EP | 1 400 973 A2 | 3/2004 |
| JP | 2001-167528 | 6/2001 |
| JP | 2004-79087 | 3/2004 |
| JP | 2004-120083 | 4/2004 |
| JP | 2005-25919 | 1/2005 |
| WO | 2005/004475 | 1/2005 |

* cited by examiner

*Primary Examiner* — Vivek Srivastava
*Assistant Examiner* — Samuel Ambaye
(74) *Attorney, Agent, or Firm* — Hamre, Schumann, Mueller & Larson, P.C.

(57) ABSTRACT

The present invention provides a recording apparatus that generates a transport stream so that a boundary between recording units (aligned units) and a file division point (i.e., a boundary between GOPs) always coincide with each other without obtaining information on the file size or the like. When generating a transport stream by time-division multiplexing transport packets, n or more transport packets (e.g., null packets N) other than a video packet are inserted between a video packet group generated from a single encoding unit (GOP) and a video packet group subsequent to the video packet group. When d indicates the data length of the transport packet, h indicates the data length of a fixed-length header added to each of the transport packets before being recorded on a data recording medium, and L indicates a recording unit length to the data recording medium, $$L \leq (n+1) \times (d+h)$$

is satisfied.

9 Claims, 4 Drawing Sheets

TRANSPORT STREAM GENERATING APPARATUS, RECORDING APPARATUS HAVING THE SAME, AND TRANSPORT STREAM GENERATING METHOD

TECHNICAL FIELD

The present invention relates to a transport stream generating apparatus and a recording apparatus having the same. In particular, the present invention relates to a transport stream generating apparatus for generating a transport stream from video data to be recorded on a data recording medium on which recording is carried out in a predetermined recording unit, and a recording apparatus having the same.

BACKGROUND ART

In recent years, due to the increase in density of data recording media such as hard discs and optical discs, these data recording media have been used widely in recording digital images including moving pictures, AV data and the like. The application range is broad, and it extends not only to peripheral equipment of computer but also to home video recorders and players used for recording and reproducing respectively a television broadcast and the like. In the future, the use of hard discs and optical discs is expected to expand further as recording media for camcorders in place of tape media.

Conventionally, MPEG (Moving Picture Experts Group) 2 transport stream specified in IEC/ISO 13818 has been used as a data method for transmitting video and audio signals in a satellite digital broadcast, a terrestrial digital broadcast and the like in Japan, Europe and the United States. In MPEG 2, a transport stream is composed of a plurality of kinds of transport packets (fixed length: 188 bytes) that are time-division multiplexed.

As transport packets, there are a video packet having information corresponding to the video of a broadcast program, an audio packet having information corresponding to the audio of a broadcast program, and a PSI/SI packet having stream information and program information, for example.

A hard disc and an optical disc such as a DVD (Digital Versatile Disc) or a BD (Blu-ray disc) are data recording media that permit random access, and they are formatted generally in a 2 k-byte logical block unit called a sector on the basis of a file system such as FAT (File Allocation Table) or UDF (Universal Disk Format). Thus, in order to write and read AV data on/from these data recording media efficiently, it is necessary to record AV data contained in a transport stream on the data recording media in a sector unit (or an integral multiple unit of a sector).

JP 2001-167528 A discloses that, therefore conventionally, when it is assumed that a transport packet provided with a transport extra header (TP_extra_Header) of 4 bytes containing time information is a source packet (192 bytes) and a collection of 32 source packets is an aligned unit (Aligned unit), the aligned unit is used as a recording unit to a data recording medium. Further, it has been considered to use an aligned unit as a recording unit. The size of an aligned unit is the least common multiple between the size of a source packet and the sector size of a data recording medium. For instance, in the above example, the size of the aligned unit is 192 bytes×32=6 k bytes, which corresponds to 3 sectors when the data length of a single sector is 2 k bytes.

When recording AV data in a transport stream on a data recording medium such as a BD, the maximum size of a single file may be limited due to a file system such as FAT 32. Thus, when recording a large amount of AV data, it is necessary to record the AV data by dividing it into a plurality of files. In this regard, when recording a single continuous transport stream by dividing it into a plurality of files, an application that prohibits dividing at a midpoint of video GOP (Group of Pictures) data may be assumed. That is, a boundary between the plurality of files recorded on the BD and a boundary between GOPs have to coincide with each other. A GOP is a group of pictures to be an encoding unit.

The reasons for the specification are as follows. For example, when an instruction to reproduce AV data from a midpoint of a file is given, since an extremely long time is required to decode the file entirely from the beginning, it is preferable that decoding can be started from the head of arbitrary GOP including a reproduction starting position. Thus, in the BD specification, an offset of each GOP first packet from the head of a file is controlled.

Further, when an instruction for reverse reproduction (decode) is given, since it is necessary to pass GOPs in the file to a decoder and obtain them in an inverse order, the data size (the number of packets) of the range that includes each GOP data is needed. In the BD specification, a GOP size is obtained from the difference between an offset of the first packet of the GOP and the first packet of the subsequent GOP. The last GOP size of a file is the difference between an offset of the first packet of the GOP and an offset of the last packet of the file. Therefore, since it is desirable that a file is not divided at a midpoint of a GOP, a file division point and a GOP boundary coincide with each other as described above in the BD specification when a single transport stream is divided into a plurality of files and recorded.

When dividing and recording a file by using an aligned unit as a recording unit as in the prior art described in JP 2001-167528 A, the size of the divided file has to be an integer multiple of the size of an aligned unit. That is, in this case, a boundary between aligned units and a file division point (namely, a GOP boundary) have to coincide with each other. However, conventionally, a boundary between aligned units and a GOP boundary do not always coincide with each other because normally a transport stream generating apparatus is not aware of a GOP boundary and a file boundary during multiplexing. As a result, conventionally, in order to satisfy both the condition of using an aligned unit as a recording unit, and the condition of coinciding a boundary between aligned units and a file division point (namely, a GOP boundary), a transport stream generating apparatus has to obtain information on the size of the divided file from the file system of a recording apparatus, and count the size of a transport stream being generated through multiplexing.

DISCLOSURE OF THE INVENTION

With the forgoing in mind, it is an object of the present invention to provide a transport stream generating apparatus that can generate a transport stream so that a boundary between recording units (aligned units) and a file division point (i.e., a boundary between GOPs) coincide with each other without obtaining information on the file size or the like, and a recording apparatus having the same.

Means for Solving Problem

In order to achieve the above object, the transport stream generating apparatus according to the present invention is a transport stream generating apparatus for generating a transport stream from video data to be recorded on a data recording medium on which recording is carried out in a predetermined recording unit. The transport stream generating apparatus includes: a video data encoding portion for encoding video data so as to generate a video packet; and a multiplexing portion for time-division multiplexing a plurality of fixed-length transport packets including at least a video packet so as to generate a transport stream. The multiplexing portion inserts n or more transport packets other than a video packet between a video packet group generated from a single encoding unit by the video data encoding portion and a video packet group subsequent to the video packet group. When d indicates the data length of the transport packet, h indicates the data length of a fixed-length header added to each of the transport packets before being recorded on the data recording medium, and L indicates the recording unit length to the data recording medium, $$L \leq (n+1) \times (d+h)$$

is satisfied.

Further, the recording apparatus according to the present invention includes the transport stream generating apparatus according to the present invention, and further includes: a recording stream generating portion for generating a recording stream as a collection of packets that is defined by a sum of the data length d of the transport packet and the data length h of the fixed-length header from a transport stream generated by the transport stream generating apparatus; and a recording portion for dividing the recording stream into the predetermined recording units and recording the recording stream on the data recording medium.

Furthermore, the transport stream generating method according to the present invention is a transport stream generating method for generating a transport stream from video data to be recorded on a data recording medium on which recording is carried out in a predetermined unit. The transport stream generating method includes: a video data encoding step for encoding video data so as to generate a video packet; and a multiplexing step for time-division multiplexing a plurality of fixed-length transport packets including at least a video packet so as to generate a transport stream. In the multiplexing step, n or more transport packets other than a video packet are inserted between a video packet group generated from a single encoding unit in the video data encoding step and a video packet group subsequent to the video packet group. When d indicates the data length of the transport packet, h indicates the data length of a fixed-length header added to each of the transport packets before being recorded on the data recording medium, and L indicates the recording unit length to the data recording medium, $$L \leq (n+1) \times (d+h)$$

is satisfied.

According to the present invention, a transport stream generating apparatus that can generate a transport stream so that a boundary between recording units and a file division point always coincide with each other without obtaining information on the file size or the like, and a recording apparatus having the same can be provided.

DESCRIPTION OF THE INVENTION

Figure 1:
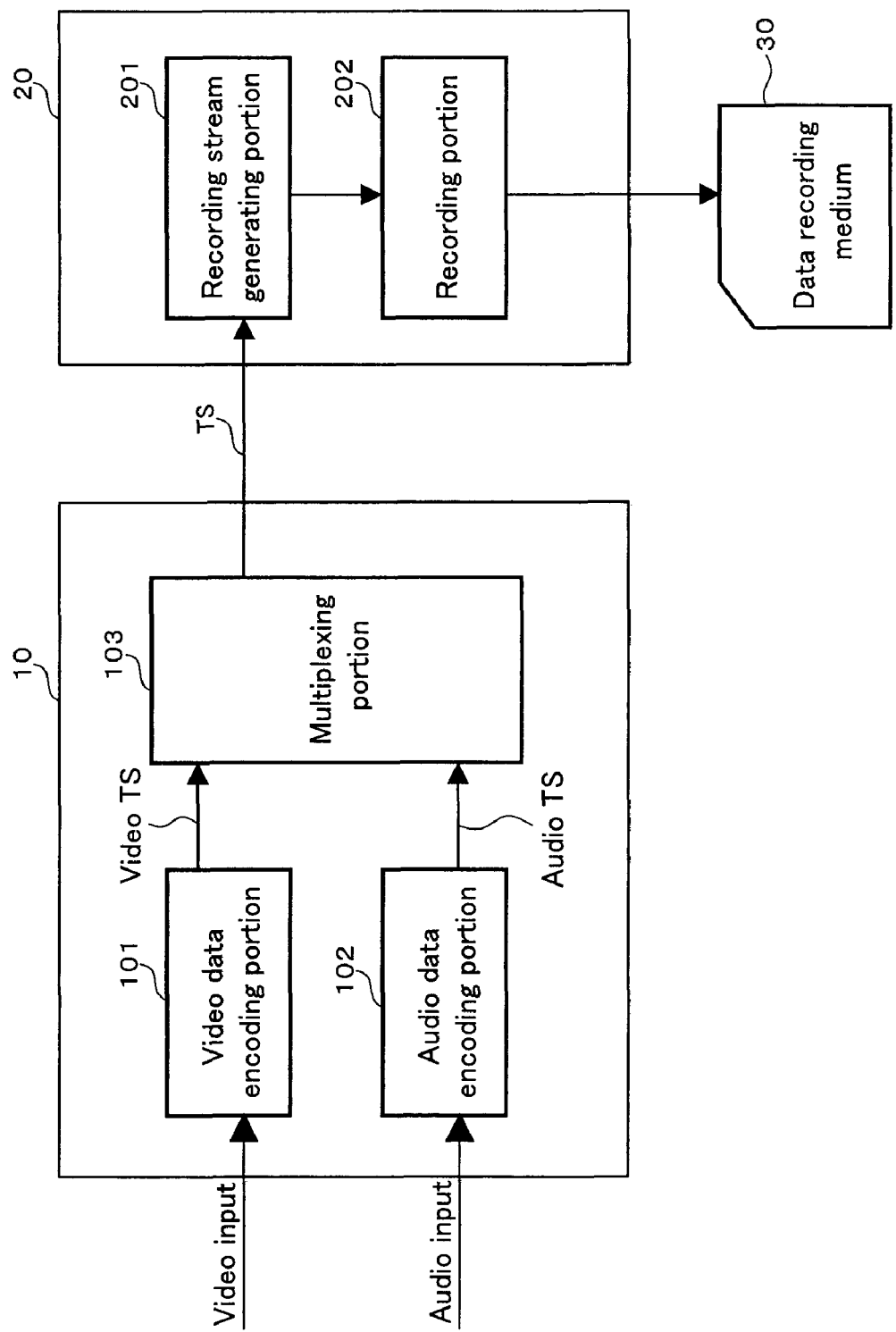
FIG. 1 is a block diagram showing schematic configurations of a transport stream generating apparatus and a recording apparatus according to one embodiment of the present invention.

As described above, the transport stream generating apparatus according to the present invention is a transport stream generating apparatus for generating a transport stream from video data to be recorded on a data recording medium on which recording is carried out in a predetermined recording unit. The transport stream generating apparatus includes: a video data encoding portion for encoding video data so as to generate a video packet; and a multiplexing portion for time-division multiplexing a plurality of fixed-length transport packets including at least a video packet so as to generate a transport stream. The multiplexing portion inserts n or more transport packets other than a video packet between a video packet group generated from a single encoding unit by the video data encoding portion and a video packet group subsequent to the video packet group. When d indicates the data length of the transport packet, h indicates the data length of a fixed-length header added to each of the transport packets before being recorded on the data recording medium, and L indicates the recording unit length to the data recording medium, $$L \leq (n+1) \times (d+h)$$

is satisfied.

According to the above configuration, (n+1)×(d+h) as a space between the starting positions of video packet groups generated from a single encoding unit in a recording stream to a data recording medium becomes larger than or equal to the recording unit length L to the data recording medium. Thus, when recording a file on a data recording medium by dividing the file, a boundary between recording units and a file division point always coincide with each other, and the file division point is positioned at a region between the video packet groups. Consequently, a transport stream generating apparatus that can generate a transport stream so that a boundary between aligned units and a file division point always coincide with each other without awareness of file division points can be achieved.

In the above configuration, it is desirable that the n transport packets inserted by the multiplexing portion include a dummy packet that does not contain significant data.

In the above configuration, it is desirable that all of the n transport packets inserted by the multiplexing portion are dummy packets that do not contain significant data.

Further, in the above configuration, it is desirable that the n transport packets inserted by the multiplexing portion include redundantly a transport packet being other than a video packet and containing significant data.

In the above configuration, it is desirable that the n transport packets inserted by the multiplexing portion include a transport packet that contains significant data corresponding to the subsequent video packet group or a video packet group subsequent thereto. As the "transport packet that contains significant data", a transport packet containing audio data may be considered, for example.

In the above configuration, it is desirable that the multiplexing portion inserts the n transport packets in accordance with an instruction from a recording apparatus for carrying out recording on the data recording medium.

Hereinafter, specific embodiments of the present invention will be described with reference to the drawings.

FIG. 1 is a block diagram showing schematic configurations of a transport stream generating apparatus and a recording apparatus according to one embodiment of the present invention. Though this embodiment refers to the case in which the transport stream generating apparatus for generating a transport stream is incorporated in the recording apparatus for a data recording medium, the transport stream generating apparatus can be implemented as separate hardware from the recording apparatus. Further, this embodiment shows the case in which a BD (Blu-ray disc) is used as a data recording medium, and MPEG2 TS is used as an encoding and transmitting method of AV data to be recorded on the data recording medium.

However, a data recording medium that can be used for the present invention is not limited to a BD, and any medium can be used as long as it is a data recording medium that permits random access and on/from which data is recorded or reproduced in a sector unit, such as a hard disc, a DVD or a SD card. A data encoding and transmitting method that can be applied in the present invention is not limited to MPEG2 TS.

As shown in FIG. 1, the recording apparatus according to the present embodiment includes primarily a transport stream generating portion 10 and a recording control portion 20. In FIG. 1, though functional blocks relevant to the present invention are only shown for simplifying the description, it is needless to say that other functional blocks or the like required as the recording apparatus may be provided.

The transport stream generating portion 10 inputs video data and audio data, generates a transport stream (TS) by performing encoding (including compression) and multiplexing, and outputs the generated transport stream to the recording control portion 20. The recording control portion 20 generates a recording stream from the transport stream sent from the transport stream generating portion 10, and records it on a data recording medium 30.

The transport stream generating portion 10 includes a video data encoding portion 101, an audio data encoding portion 102, and a multiplexing portion 103. The video data encoding portion 101 receives video data, and encodes including compression) the video data so as to generate a video elementary stream (indicated as video ES in FIG. 2) shown at the top row in FIG. 2. The video data encoding portion 101 divides the video elementary stream into transport packets (video transport packets), each of which has a fixed length of 188 bits, and sends them to the multiplexing portion 103 as a video transport stream indicated as video TS in FIG. 2) shown at the second row from the top in FIG. 2.

The audio data encoding portion 102 receives audio data, and generates an audio elementary stream (not shown) by encoding (including compression) the audio data. The audio data encoding portion 102 divides the audio elementary stream into transport packets (audio transport packets) each of which has a fixed length of 188 bits, and send them to the multiplexing portion 103 as an audio transport stream (not shown).

Figure 2:
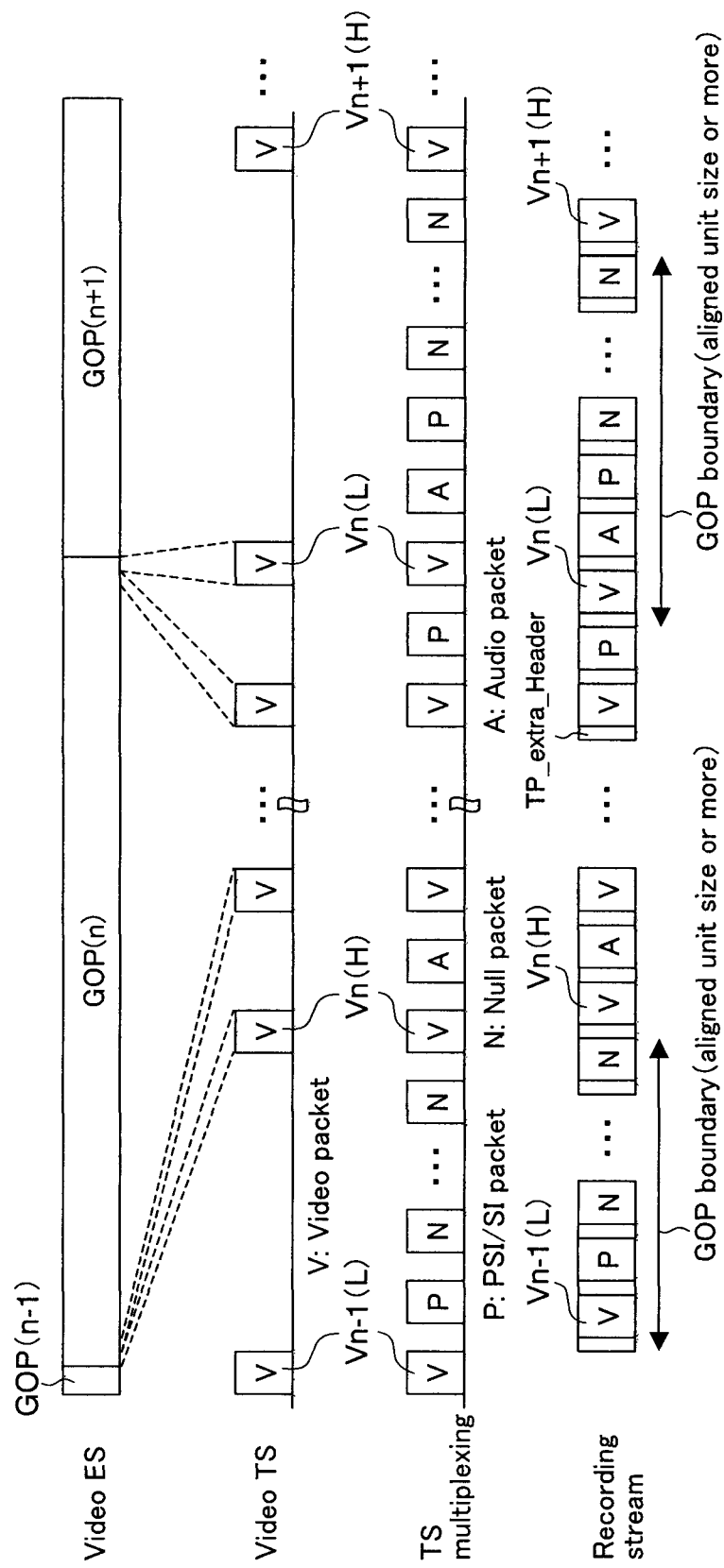
FIG. 2 is a schematic diagram showing a state of stream generation in one embodiment of the present invention.

The multiplexing portion 103 time-division multiplexes video transport packets and audio transport packets sent thereto through the video transport stream and the audio transport stream respectively, and generates a transport stream shown at the third row from the top in FIG. 2. Each of a video transport packet and an audio transport packet has an ID (referred to as PID) at its packet header, for indicating which data each packet represents. The multiplexing portion 103 generates a PSI (Program Specification Information) packet or an SI (Service Information) packet on the basis of the PID, and multiplexes it together with the video transport stream and the audio transport stream.

Both the PSI packet and the SI packet are also transport packets having a fixed length of 188 bits. A PSI packet contains information such as what kind of data each PID contains. The PSI packet is, for example, a transport packet called a PAT packet or a PMT packet. The SI packet is, for example, a transport packet called an SIT packet.

The multiplexing portion 103 inserts n null packets into a GOP boundary. A GOP boundary refers to a space between a video transport packet group generated from a single GOP as an encoding unit and a video transport packet group subsequent to the video transport packet group. A null packet is a transport packet having a fixed length of 188 bytes that does not contain significant data, and has a value of 0x1FFF as its PID, for example.

When d indicates the data length of a transport packet, h indicates the data length of a fixed-length header (TP_extra_Header) added to each transport packet before being recorded on a recording medium, and L indicates the recording unit length (the data length of an aligned unit) to the data recording medium, $$L \leq (n+1) \times (d+h)$$

is satisfied.

In this embodiment, since d=188 bytes, h=4 bytes, and L=6 k bytes, it may be sufficient that n is at least 31. In order to simplify control at the multiplexing portion 103, 31 null packets may be inserted constantly into a GOP boundary. The multiplexing portion 103 is notified, from the video data encoding portion 101, of the number of video transport packets composing a video transport packet group generated from a single GOP, and it can recognize a GOP boundary by comparing this number with the number of video transport packets that have already been multiplexed.

In the example shown in FIG. 2, 31 null packets are multiplexed by the multiplexing portion 103 between $V_{n-1(L)}$ as the last packet of a video transport packet group generated from a GOP (n−1) shown at the top row, and $V_{n(H)}$ as the first packet of a video transport packet group generated from a GOP (n). Further, 31 null packets are multiplexed between $V_{n(L)}$ as the last packet of the video transport packet group generated from the GOP (n), and $V_{n+1(H)}$ as the first packet of a video transport packet group generated from a GOP (n+1).

Besides the n null packets, a transport packet such as an audio packet, a PSI packet, or an SI packet may be multiplexed into a GOP boundary. The n null packets inserted into a GOP boundary do not necessarily have to be n consecutive null packets. That is, a transport packet such as an audio packet, a PSI packet or an SI packet may be multiplexed among the n null packets.

A transport stream generated by carrying out such multiplexing is sent to the recording control portion 20 as described above, and a header (TP_extra_Header) having a fixed length of 4 bits is added to each of the transport packets by a recording stream generating portion 201, and a continuous recording stream as shown at the bottom row in FIG. 2 is generated. The generated recording stream is sent to a recording portion 202, and is recorded on the data recording medium 30 in an aligned unit.

Here, n null packets are inserted into a GOP boundary, and thus, among the data length d of a transport packet, the data length h of a header added to each of the transport packets, and the recording unit length L to the data recording medium, $$L \leq (n+1) \times (d+h)$$

is satisfied.

That is, $(n+1) \times (d+h)$ as the length of a GOP boundary in the recording stream is larger than or equal to the recording unit length L to the data recording medium. Therefore, since a GOP boundary becomes longer than or equal to an aligned unit, when the recording control unit 20 records a file on the data recording medium 30 by dividing the file, a boundary between aligned units and a file division point always coincide with each other, and a file division point is positioned at a GOP boundary.

Thus, without awareness of a file division point, the transport stream generating portion 10 can generate a transport stream so that a boundary between aligned units and a file division point always coincide with each other, and the file division point is positioned at the GOP boundary.

In the above example, though n null packets are inserted into every GOP boundary, the following mode is also possible.

For example, it also may be considered that null packets and transport packets that are other than video transport packets are inserted into a GOP boundary so that their sum becomes n. In this case, when the multiplexing portion 103 multiplexes $n_1$ audio transport packets and $n_2$ PSI packets or SI packets into a GOP boundary, $(n-n_1-n_2)$ null packets may be inserted into this GOP boundary.

A transport packet that is other than a video packet and an audio packet and that contains significant data (e.g., a PSI packet, an SI packet or the like) may be included redundantly in the n transport packets inserted into a GOP boundary.

For example, regarding the PSI packet and the SI packet, though Japanese digital broadcasting regulations (ARIB) and the BD specification specify the longest period (interval) for multiplexing a PSI packet or an SI packet into a transport stream, they do not specify the shortest period. According to ARIB, a PAT packet and a PMT packet have to be multiplexed into a transport stream at the maximum of a 100 msec period. Further, a SIT packet has to be multiplexed into a transport stream at the maximum of a 1 sec period. On the other hand, as mentioned above, the shortest period for these packets in a transport stream is not specified, and even if a PSI packet or a SI packet is multiplexed redundantly, no problems arise during decoding. Accordingly, a GOP boundary may be made longer than or equal to an aligned unit by including a PSI packet or an SI packet that is multiplexed redundantly in the GOP boundary.

Alternatively, it may be considered also that an audio transport packet containing audio data corresponding to a subsequent GOP in the n transport packets is inserted into the GOP boundary. To describe specifically the example shown in FIG. 2, an audio transport packet containing audio data corresponding to video data of the GOP (n) or to a subsequent GOP may be inserted between the $V_{n-(L)}$ as the last packet of a video transport packet group generated from the GOP (n−1) and the $V_{n(H)}$ as the first packet of a video transport packet group generated from the GOP (n).

In this case, the multiplexing portion 103 inserts audio transport packets corresponding to one or more GOPs subsequent to the GOP (n) between the $V_{n-1(L)}$ and the $V_{n(H)}$. The number of the audio transport packets that can be inserted by the multiplexing portion 103 is determined in accordance with the specification of the transport stream decoding side. For example, a decoding model is specified in MPEG2 TS, and thus the transport stream generating apparatus is required to carry out encoding without breaching the decoding model. In standards adopting MPEG2 TS, it is not uncommon to redefine the decoding model. The decoding model specifies buffer sizes in respective processes during decoding, transfer rates among respective processes, and the like. Therefore, it is necessary that the multiplexing portion 103 carries out multiplexing within the range that does not breach the decoding model. Thus, the number of audio transport packets corresponding to the one or more subsequent GOPs that can be inserted into a GOP boundary can be determined in accordance with the audio bit rate and the buffer size specified in the decoding model.

In the above specific embodiment, the configuration in which the multiplexing portion 103 inserts n transport packets into each GOP boundary is described. Though the multiplexing portion 103 itself may insert packets into each GOP boundary without receiving an instruction from anywhere, the multiplexing portion 103 may insert packets by receiving an instruction from the recording control portion 20. Hereinafter, the specific processes therein will be described by referring to the example in which the multiplexing portion 103 inserts null packets into a GOP boundary during a period in which it receives an instruction to insert null packets from the recording control portion 20.

Figure 3:
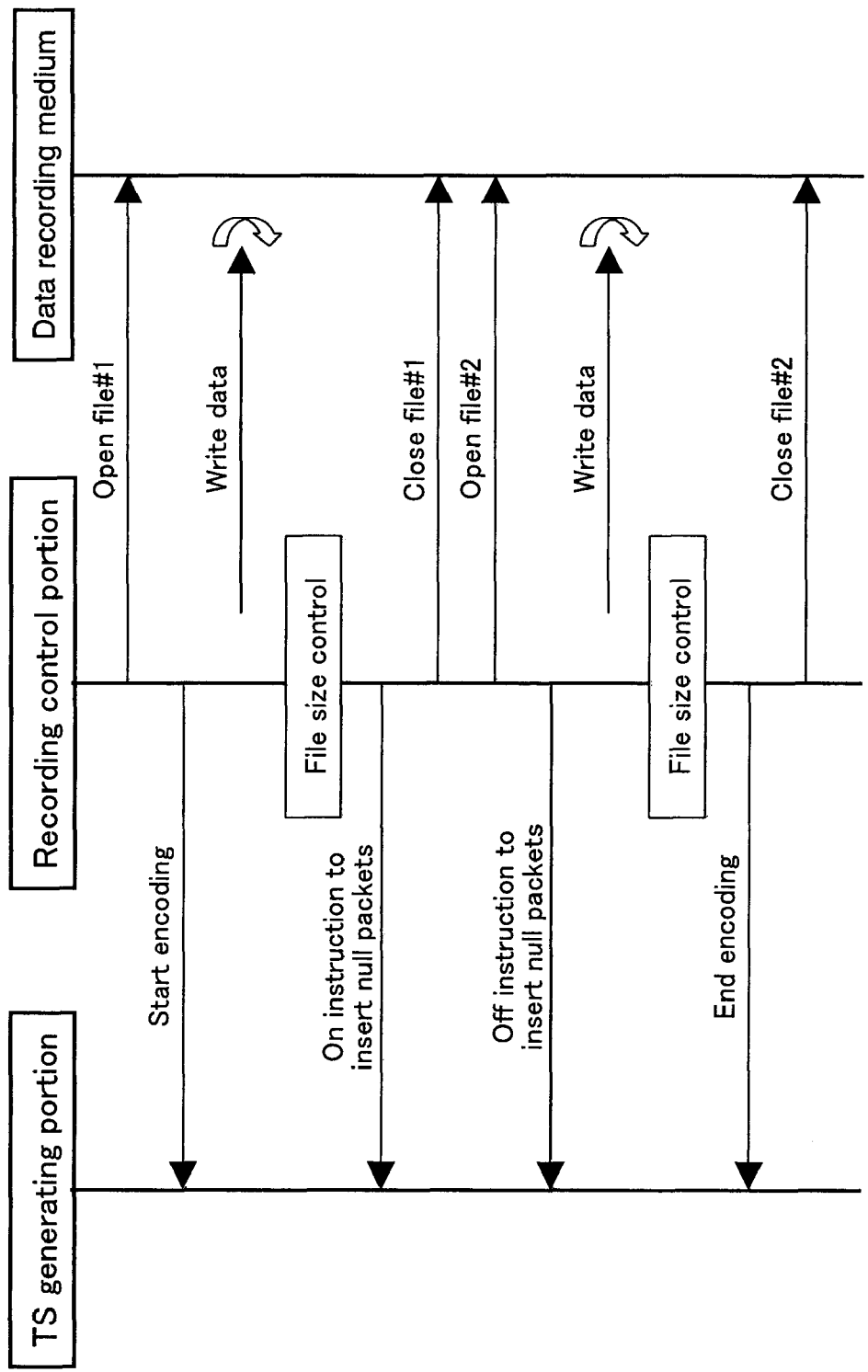
FIG. 3 is a chart showing exchanges of a variety of instructions and data among a transport stream generating portion, a recording control portion and a data recording medium.
Figure 4:
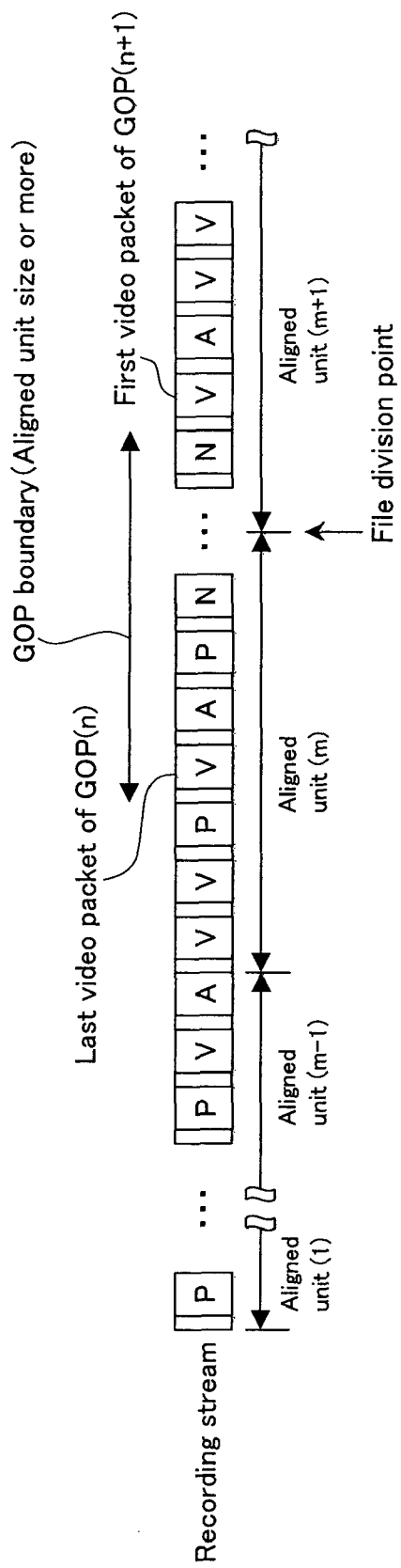
FIG. 4 is a schematic diagram showing one example of a recording stream generated in the process steps shown in FIG. 3.

FIG. 3 is a chart showing exchanges of a variety of instructions and data among the transport stream generating portion 10, the recording control portion 20 and the data recording medium 30 in the case where the multiplexing portion 103 inserts null packets by receiving an instruction from the recording portion 20.

In this case, when recording of a file on the data recording medium 30 is started, the recording control portion 20 first opens a file #1, and sends an instruction to start encoding to the transport stream generating portion 10 as shown in FIG. 3. Consequently, the transport stream generating portion 10 starts to generate a transport stream, and the generated transport stream is passed to the recording control portion 20.

The recording control portion 20 generates a recording stream from the received transport stream from the transport stream generating portion 10, and records it into the file #1 in the data recording medium 30 in an aligned unit. Subsequently, while generation of transport streams by the transport stream generating portion 10 and recording of the generated transport streams on the data recording medium 30 are repeated, the recording control portion 20 controls the size of the file #1.

The file system of the recording control portion 20 recognizes the maximum recordable file size $S_{max}$ on the data recording medium 30. When L indicates the data length of an aligned unit, m indicates an integer, and $L \times m \leq S_{max} \leq L \times (m+1)$ is satisfied, the recording control portion 20 sends an instruction to insert null packets to the transport stream generating portion 10 prior to several GOPs (e.g., 2 to 3 GOPs) by recognizing $S_{max}$ to the file #1. After receiving this instruction, the transport stream generating portion 10 inserts 31 null packets into a GOP boundary. As an instruction to insert null packets, the recording control portion 20 turns on the null inserting function when the file size of the file #1 by the recording control portion 20 approaches the default maximum size, and turns off the null inserting function when the recording control portion 20 recognizes that the file to be inserted with null packets is switched to the next file (switching from the file #1 to the file #2 in FIG. 3). As a result, a boundary between an aligned unit m and an aligned unit (m+1) is positioned always at a GOP boundary, and thereby the boundary between the aligned unit m and the aligned unit (m+1) can be made as a file division point.

As described above, according to the configuration in which packets are inserted in accordance with an instruction from the recording control portion 20, since null packets and the like are inserted only into GOP boundaries in the vicinity of a file division point, unnecessary increase of the data can be avoided.

Though several embodiments of the present invention are described above, these descriptions are by way of example, and a variety of modifications can be made. For example, in the above description, though the configuration in which a transport stream is generated by multiplexing video data and audio data is described, the present invention can be implemented also as an apparatus for generating a transport stream composed only of video data. Furthermore, though the configuration in which the recording control portion 20 generates a recording stream from a transport stream is shown in FIG. 1, it is possible to configure the present invention so that a recording stream is generated from a transport stream at the transport stream generating portion 10, and is sent to the recording control portion 20.

In the above specific embodiment, the transport stream generating apparatus is incorporated in the recording apparatus. Examples corresponding to this embodiment include a video recorder for recording an analog television broadcast digitally, a camcorder for recording captured images digitally and the like. However, the present invention is not limited to the embodiments, and it can be applied also to a transport stream generating apparatus installed at each television broadcast station. In this case, a transport stream generated by the transport stream generating apparatus is subjected to a scramble processing and the like, and then delivered to the viewer side.

The functions of the transport stream generating apparatus as described above can be implemented by a single LSI. Such an LSI is also one of the embodiments of the present invention.

INDUSTRIAL APPLICABILITY

The present invention provides a transport stream generating apparatus for generating a transport stream from video data and audio data to be recorded on a recording medium on which recording is carried out in a predetermined recording unit, and a recording apparatus having the same.

The invention claimed is:

1. A transport stream generating apparatus for generating a transport stream from video data to be recorded on a data recording medium on which recording is carried out in a predetermined recording unit, the transport stream generating apparatus comprising:
a video data encoding portion for encoding video data so as to generate a video packet; and
a multiplexing portion for time-division multiplexing a plurality of fixed-length transport packets including at least a video packet so as to generate a transport stream,
wherein the multiplexing portion inserts a predetermined number of transport packets other than a video packet between a video packet group generated from a single encoding unit by the video data encoding portion and a video packet group subsequent to the video packet group, and
when n indicates the predetermined number of transport packets inserted by the multiplexing portion, d indicates a data length of the transport packet, h indicates a data length of a fixed-length header added to each of the transport packets before being recorded on the data recording medium, and L indicates a recording unit length to the data recording medium, $$L \leq (n+1) \times (d+h)$$

is satisfied.

2. The transport stream generating apparatus according to claim 1, wherein the n transport stream packets inserted by the multiplexing portion include a dummy packet that does not contain significant data.

3. The transport stream generating apparatus according to claim 1, wherein all the n transport packets inserted by the multiplexing portion are dummy packets that do not contain significant data.

4. The transport stream generating apparatus according to claim 1, wherein the n transport packets inserted by the multiplexing portion include redundantly a transport packet other than a video packet that contains significant data.

5. The transport stream generating apparatus according to claim 1, wherein the n transport packets inserted by the multiplexing portion include a transport packet that contains significant data corresponding to the subsequent video packet group or a video packet group subsequent thereto.

6. The transport stream generating apparatus according to claim 1, wherein the multiplexing portion inserts the n transport packets in accordance with an instruction from a recording apparatus for carrying out recording on the data recording medium.

7. A recording apparatus comprising the transport stream generating apparatus according to claim 1,
wherein the recording apparatus further comprises: a recording stream generating portion for generating a recording stream as a collection of packets that is defined by a sum of a data length d of the transport packet and a data length h of the fixed-length header from a transport stream generated by the transport stream generating apparatus; and a recording portion for dividing the recording stream into the predetermined recording units and recording the recording stream on the data recording medium.

8. A transport stream generating method for generating a transport stream from video data to be recorded on a data recording medium on which recording is carried out in a predetermined unit, the transport stream generating method comprising:
a video data encoding step for encoding video data so as to generate a video packet; and
a multiplexing step for time-division multiplexing a plurality of fixed-length transport packets including at least a video packet so as to generate a transport stream,
wherein, in the multiplexing step, a predetermined number of transport packets other than a video packet are inserted between a video packet group generated from a single encoding unit in the video data encoding step and a video packet group subsequent to the video packet group, and
when n indicates the predetermined number of transport packets inserted in the multiplexing step, d indicates a data length of the transport packet, h indicates a data length of a fixed-length header added to each of the transport packets before being recorded on the data recording medium, and L indicates a recording unit length to the data recording medium, $$L \leq (n+1) \times (d+h)$$

is satisfied.

9. A transport stream generating LSI for generating a transport stream from video data to be recorded on a data recording medium on which recording is carried out in a predetermined unit, the transport stream generating LSI comprising:
a video data encoding portion for encoding video data so as to generate a video packet; and a multiplexing portion for time-division multiplexing a plurality of fixed-length transport packets including at least a video packet so as to generate a transport stream, wherein, the multiplexing portion inserts a predetermined number of transport packets other than a video packet between a video packet group generated from a single encoding unit by the video data encoding portion and a video packet group subsequent to the video packet group, and when n indicates the predetermined number of transport packets inserted by the multiplexing portion, d indicates a data length of the transport packet, h indicates a data length of a fixed-length header added to each of the transport packets before being recorded on the data recording medium, and L indicates a recording unit length with respect to the data recording medium, $$L \leq (n+1) \times (d+h)$$

is satisfied.

* * * * *